Sept. 21, 1965     S. M. PATTILLO     3,207,538
TAPERED SHEET METAL PIPE AND JOINT THEREFOR
Filed Dec. 18, 1961
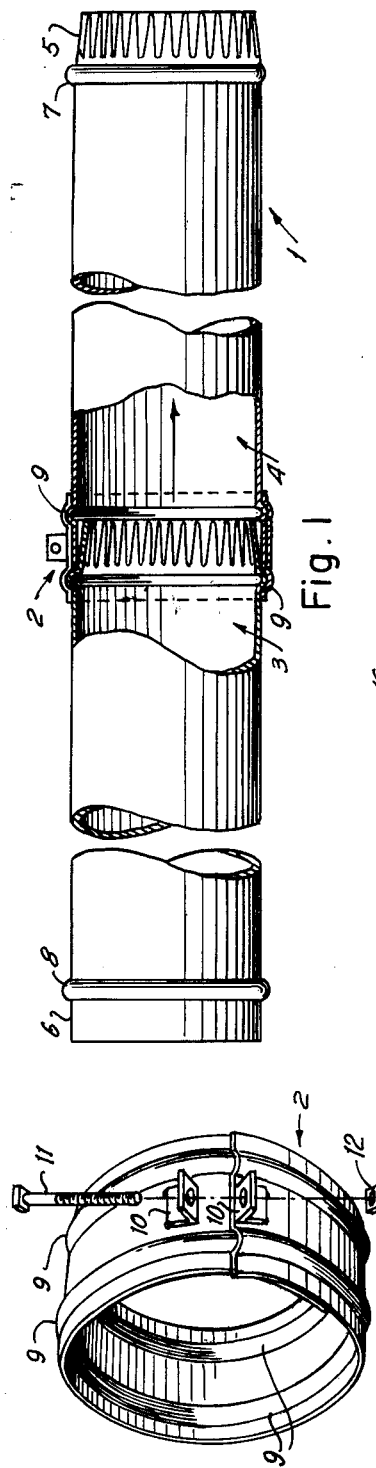
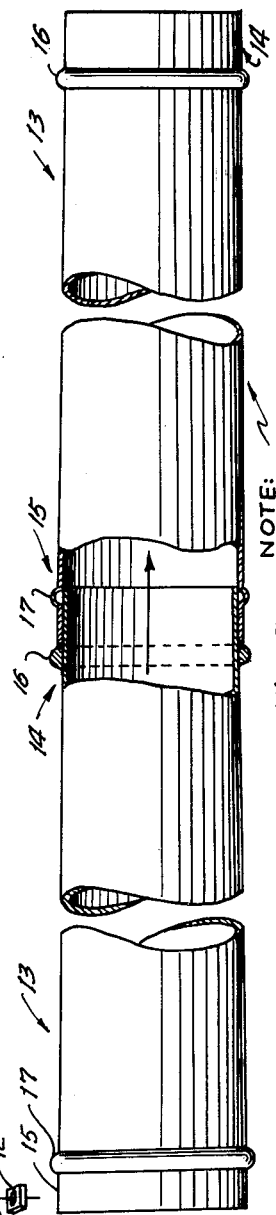
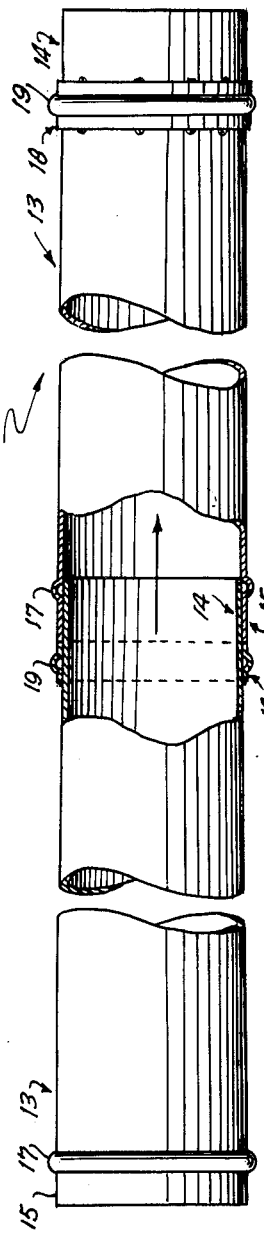
NOTE:
8' LENGTH PIPE HAS
APPROX. 1/8" DIFFERENCE
IN I.D. AT ENDS.
Fig. 1
Fig. 2
Fig. 3
Fig. 4
INVENTOR.
Sidney M. Pattillo
BY
ATTORNEY United States Patent Office 3,207,538
Patented Sept. 21, 1965

3,207,538
TAPERED SHEET METAL PIPE AND
JOINT THEREFOR
Sidney M. Pattillo, Rte. 3, Box 194J, Lubbock, Tex.
Filed Dec. 18, 1961, Ser. No. 160,168
3 Claims. (Cl. 285—410)

This invention relates to a sheet metal pipe, and it concerns more particularly a sheet metal pipe which is peculiarly adapted for use as a pneumatic conveyor duct, for conveying away trash separated from cotton preparatory to ginning it, for example, such trash having associated therewith sand and other matter resulting from stripping of the cotton stalks in the field to remove the cotton.

Sheet metal pipe as ordinarily constructed is formed in sections having male and female end portions whereby the adjacent ends of adjoining sections are connected to each other, the male end of each section being tapered radially inwardly and being corrugated or fluted, and the female end thereof being cylindrical and plain. Both ends have peripheral beads which are formed by deforming portions of the material thereof radially outwardly, and a draw band having corresponding circumferential grooves embraces the adjacent ends of adjoining sections whereby the sections are positively secured against longitudinal displacement relative to each other.

Sheet metal pipe for the purpose described advantageously may be about 13 inches in diameter, for example. Such pipe is commonly available in 8 foot lengths, and the inner extremity of the male end may be spaced radially inwardly about ¼ inch from the female end, so that in use the sand and other debris, as propelled thru the pipe by a stream of air moving at high velocity, acts as a sand blast, cutting arcuate slots in the male end portion as it begins to taper inwardly, and the slots become progressively enlarged and filled with trash which ultimately stops up the pipe.

Conventional sheet metal pipe is further characterized by joints as described which are non-rigid and which require the pipe to be additionally supported while at the same time allowing it to sag at the joints.

Ordinary sheet metal pipe as above described may have as many as a dozen joints in a 100 foot length of pipe. Such relatively large numbers of joints, each of which tends to restrict the cross sectional area of the pipe at the joint whereby the flow of materials thru the pipe is retarded, tends to increase the power required to move materials thru the pipe.

An object of this invention is to provide a sheet metal pipe which is characterized by its uninterrupted, uniformly smooth interior surfaces and by its smooth, comparatively rigid joints connecting the adjacent ends of adjoining sections.

The structure of the sheet metal pipe of the invention is such that abrasion and cutting of the pipe at the joints by the action of material flowing thru the pipe, as described, is avoided, the need for re-beading and crimping the pipe is eliminated, and the useful life of the pipe is substantially increased.

The smooth flow of materials thru the pipe results in less consumption of power required to supply compressed air sufficient to move a stream of materials flowing thru the pipe, due to less friction.

The more rigid joints connecting adjoining sections make the pipe relatively self supporting at its joints, thus reducing the need for additional support while at the same time maintaining the pipe substantially straight.

The sheet metal pipe of the invention comprises, in combination, a plurality of longitudinal sections each slightly tapered throughout its length, the radius of the pipe at one end of each section being larger than at its opposite end by a distance corresponding substantially to the thickness of the material, whereby the smaller end of one section is received telescopically in the larger end of an adjoining section and is secured therein partly by friction fit, the opposite ends of each section having peripheral beads, and a draw band having corresponding circumferential grooves embracing the adjacent ends of adjoining sections whereby the sections are positively secured against longitudinal displacement relative to each other, the peripheral bead on the larger end of each section only consisting of a portion of the material thereof which is deformed radially outwardly, the smaller end of each section having smooth inner and outer surfaces and traversing the peripheral bead on the adjacent end of an adjoining section, interiorly thereof, and the peripheral bead on the smaller end of each section being formed by a separate preformed ring which is secured to the smaller end of the section, exteriorly thereof, as by spot welding, the ring having a portion coextensive with its circumference conforming substantially to the peripheral bead on the adjacent end of an adjoining section.

In one form of the invention the separate preformed ring advantageously may comprise a solid metal ring which is half round in transverse section.

In another form of the invention the separate preformed ring may comprise a sheet metal ring or band having a peripheral bead consisting of a portion of the material thereof which is deformed radially outwardly.

The invention will be readily understood by referring to the following description and the accompanying drawing, in which:

FIG. 1 is a longitudinal view, partly broken away, showing two adjoining sections of sheet metal pipe as ordinarily constructed and the joint whereby adjacent ends of the two sections are connected to each other.

FIG. 2 is a perspective view on an enlarged scale showing a draw band whereby adjacent ends of adjoining sections of sheet metal pipe are ordinarily connected to each other, as illustrated in FIG. 1;

FIG. 3 is a view similar to FIG. 1 showing a sheet metal pipe embodying this invention with the draw band removed; and FIG. 4 is a view similar to FIG. 3 showing a modified form of the invention.

Referring to FIGS. 1 and 2 of the drawing, the numerals 1 designate generally two adjoining sections of sheet metal pipe of conventional design, and the numeral 2 indicates generally a draw band whereby the adjacent ends of two adjoining sections of sheet metal pipe such as the sections 1 are ordinarily connected to each other.

The sections 1 each have male and female end portions as hereinafter described, designated generally by the numerals 3 and 4, respectively, which coact with a draw band such as the draw band 2 to connect the adjacent ends of two adjoining sections such as the sections 1 to each other.

The male end 3 of each section 1 is tapered radially inwardly and is corrugated or fluted, as at 5, and the female end 4 therof is cylindrical and plain, as at 6. The ends 3 and 4 have peripheral beads 7 and 8, respectively, both of which are produced by deforming portions of the material thereof radially outwardly.

A draw band such as the draw band 2, which has a pair of circumferential grooves 9 corresponding to the peripheral beads 7 and 8, respectively, embraces the adjacent ends of two adjoining sections such as the sections 1 whereby the sections are positively secured against longitudinal displacement relative to each other.

The draw band 2 has lugs 10 on opposite end portions thereof which are connected by a bolt 11 whereby the draw band 2 is adapted to be secured about two adjoining sections such as the sections 1 by tightening a nut 12 which is applied to the bolt 11.

Referring to FIG. 3 of the drawing, the numerals 13 designate generally two adjoining sections of sheet metal pipe embodying this invention, which are connected to each other by a draw band (not shown) such as the draw band 2 shown in FIGS. 1 and 2.

The sections 13 are each slightly tapered throughout its length, the radius of the pipe at one end of each section being larger than at its opposite end by a distance corresponding substantially to the thickness of the material, whereby the smaller end, designated generally by the numeral 14, is received telescopically in the larger end, indicated generally by the numeral 15, of an adjoining section and is secured therein partly by friction fit.

The ends 14 and 15 of each section 13 have peripheral beads 16 and 17, respectively, and a draw band (not shown) such as the draw band 2 embraces the adjacent ends of adjoining sections such as the sections 13 whereby the sections are positively secured against longitudinal displacement relative to each other.

The peripheral bead 17 on the larger end 15 of each section only consists of a portion of the material thereof which is deformed radially outwardly.

The smaller end 14 of each section 13 has smooth inner and outer surfaces and traverses the peripheral bead 17 on the adjacent end of an adjoining section, interiorly thereof. The peripheral bead 16 on the smaller end 14 of each section is formed by a separate preformed ring, comprising a solid metal ring, half round in transverse section, conforming substantially to the peripheral bead 17 on the adjacent end 15 of an adjoining section, which is secured to the smaller end 14 of the section 13, exteriorly thereof, as by spot welding.

FIG. 4 shows a modified form of the invention in which a peripheral bead corresponding to the peripheral bead 16 shown in FIG. 3 is formed by a separate preformed ring, comprising a sheet metal ring or band 18 having a peripheral bead 19 consisting of a portion of the material thereof which is deformed radially outwardly, which is secured to the smaller end 14 of the section 13, exteriorly thereof, as by spot welding.

The invention may be modified in various ways without departing from the spirit and scope thereof.

I claim:

1. A sheet metal pipe comprising, in combination, a plurality of longitudinal sections each slightly tapered throughout its length, the radius of the pipe at one end of each section being larger than at its opposite end by a distance corresponding substantially to the thickness of the material, whereby the smaller end of one section is received telescopically in the larger end of an adjoining section and is secured therein partly by friction fit, the opposite ends of each section having peripheral beads, and a draw band having corresponding circumferential grooves embracing the peripheral beads on the adjacent ends of adjoining sections whereby the sections are positively secured against longitudinal displacement relative to each other, the peripheral bead on the larger end of each section only consisting of a portion of the material thereof which is deformed radially outwardly, the smaller end of each section having smooth inner and outer surfaces and traversing the peripheral bead on the adjacent end of an adjoining section, interiorly thereof, and the peripheral bead on the smaller end of each section being formed by a separate preformed ring which is secured to the smaller end of the section, exteriorly thereof, the ring having a portion coextensive with its circumference conforming substantially to the peripheral bead on the adjacent end of an adjoining section.

2. The structure of claim 1, the separate preformed ring comprising a solid metal ring which is half round in transverse section.

3. The structure of claim 1, the separate preformed ring comprising a sheet metal ring or band having a peripheral bead consisting of a portion of the material thereof which is deformed radially outwardly.

References Cited by the Examiner

UNITED STATES PATENTS

| 366,515 | 7/87 | Shipe | 285—424 |
| 823,591 | 6/06 | Eager | 285—420 |
| 1,052,112 | 2/13 | Welch | 285—410 |
| 1,870,770 | 8/32 | DeWitt | 285—332 |
| 2,398,788 | 4/46 | Hedrick | 285—424 |
| 2,727,536 | 12/55 | Tennison | 285—390 |

FOREIGN PATENTS

| 928,925 | 6/55 | Germany. |
| 549,183 | 11/42 | Great Britain. |

CARL W. TOMLIN, *Primary Examiner.*

THOMAS F. CALLAGHAN, *Examiner.*